(12) United States Patent
Carton et al.

(10) Patent No.: US 7,656,626 B2
(45) Date of Patent: Feb. 2, 2010

(54) ELECTRIC ARC DETECTION DEVICE, SWITCHGEAR UNIT COMPRISING ONE SUCH DEVICE AND METHOD FOR DETECTING AN ELECTRIC ARC

(75) Inventors: Hervé Carton, Livron (FR); Thomas Stemmelen, Valence (FR)

(73) Assignee: Crouzet Automatismes, Valence (FR)

( * ) Notice: Subject to any disclaimer, the term of this patent is extended or adjusted under 35 U.S.C. 154(b) by 513 days.

(21) Appl. No.: 11/730,914

(22) Filed: Apr. 4, 2007

(65) Prior Publication Data

US 2007/0242399 A1 Oct. 18, 2007

(30) Foreign Application Priority Data

Apr. 11, 2006 (FR) .................................. 06 03226

(51) Int. Cl.
*H02H 3/00* (2006.01)
(52) U.S. Cl. ....................................................... 361/42
(58) Field of Classification Search .................... 361/42
See application file for complete search history.

(56) References Cited

U.S. PATENT DOCUMENTS

| | | | | |
|---|---|---|---|---|
| 3,636,458 A | * | 1/1972 | Sugiyama et al. ............. 327/95 |
| 4,978,865 A | * | 12/1990 | Hartmann et al. ............ 307/140 |
| 5,835,321 A | * | 11/1998 | Elms et al. ..................... 361/45 |
| 5,933,305 A | | 8/1999 | Schmalz et al. ............... 361/42 |
| 6,532,424 B1 | * | 3/2003 | Haun et al. ..................... 702/58 |
| 7,218,493 B2 | * | 5/2007 | Colombo et al. .............. 361/65 |
| 7,349,188 B2 | * | 3/2008 | Zuercher et al. .............. 361/42 |
| 2005/0001751 A1 | * | 1/2005 | Inukai et al. ................. 341/143 |
| 2008/0143461 A1 | * | 6/2008 | Hastings et al. ................. 335/7 |

FOREIGN PATENT DOCUMENTS

| EP | 0 639 879 | 2/1995 |
|---|---|---|
| EP | 1 429 437 | 6/2004 |

* cited by examiner

*Primary Examiner*—Robert DeBeradinis
*Assistant Examiner*—Scott Bauer
(74) *Attorney, Agent, or Firm*—Steptoe & Johnson LLP

(57) ABSTRACT

The invention relates to an electric arc detection device comprising analyzing means supplying current and voltage integration signals. The analyzing means supply current and voltage differential signals. Decision-making means comprise a disable unit supplying adaptive disable signals and comprising detection means supplying at least one decision-making aid signal according to at least one adaptive disable signal and to the current differential signal or the current integration signal. A decision-making unit supplies a trip signal according to the decision-making aid signals.

50 Claims, 8 Drawing Sheets

ELECTRIC ARC DETECTION DEVICE, SWITCHGEAR UNIT COMPRISING ONE SUCH DEVICE AND METHOD FOR DETECTING AN ELECTRIC ARC

BACKGROUND OF THE INVENTION

The invention relates to an electric arc detection device comprising measuring means for measuring an AC current and an AC voltage, and analyzing means connected to the measuring means. The analyzing means compute an integral of an absolute value of the AC current over at least one mains half-wave, at the rhythm of a sequencing signal, and supply a current integration signal. Said means also compute an integral of an absolute value of the AC voltage over at least one mains half-wave and supply a voltage integration signal. The analyzing means comprise differentiation means supplying a current differential signal representative of the difference between a first current integration signal and a second current integration signal measured over a period before said first integration signal. The differentiation means also supply a differential voltage signal representative of the difference between a first voltage integration signal and a second voltage integration signal measured over a period before said first integration signal. The electric arc detection device further comprises decision-making means connected to the analyzing means and designed to send at least one trip signal.

The invention also relates to a switchgear device comprising one such electric arc detection device and to a method for detecting an electric arc. The method for detecting an electric arc comprises measurement of an AC current and an AC voltage by means of measuring means, computation at the rhythm of a sequencing signal of an integral of an absolute value of the AC current and of the AC voltage over at least one mains half-wave and of a current integration signal and a voltage integration signal. The method for detecting an electric arc comprises supply of a current differential signal representative of the difference between a first current integration signal and a second current integration signal measured over a period before said first integration signal and supply of a differential voltage signal representative of the difference between a first voltage integration signal and a second voltage integration signal measured over a period before said first integration signal.

STATE OF THE PRIOR ART

Electrical installations are generally protected by first protection means such as in particular circuit breakers with thermal and/or magnetic and/or electronic tripping.

For example, thermal protection means are efficient in case of an electric fault due to an overload or a short-circuit. This type of fault does not generally cause irreversible incidents and the damage is then limited to local material degradations.

In addition, thermal protection can be inefficient when the intensity of the arcing current is too weak to cause heating of the thermal means such as a bimetal strip. Thermal protection is also inefficient when the reaction time of the thermal means is too slow, even if the arcing current is sufficiently intense to heat the bimetal strip.

The presence of an arc can have serious consequences, in particular if the arc occurs in an explosive or a flammable environment. Thus, in order to make protection of installations safe, in particular for aeronautical installations, the first protection means can then be associated with second protection means. As measurement of the energy dissipated by an arc detected by a thermal device is insufficient, this measurement has to be completed by signal processing techniques enabling electric arc signatures to be identified. These signatures are known and specified by the civil arc detection standard UL1699 and the aeronautical standard AS 5692

Two main families of electric arcs are known. The first family concerns arcs called parallel arcs and the second family concerns arcs called series arcs.

Among the parallel arcs, the arc called guillotine arc, the arc called saline arc and the arc called chafing arc can be identified in particular.

The guillotine arc is generated when a blunt conducting part comes into contact with a live conductor of an electric wire whose insulator has been cut, the conducting part and the conductor not being at the same electric potential.

The saline arc is generated when a drop of saline water is present episodically between two electric conductors, the two conductors not being at the same electric potential. The saline water solution applied between two bared conductors creates a conducting path between the conductors.

The chafing arc is generated when friction occurs between a portion of bared wire and a conducting part, the two elements not being at the same electric potential.

The series arc is generated at the point of contact between two conducting parts through which an electric current is flowing. For example, series arcs can occur between a terminal connector of an electric cable and a connection terminal of a switchboard panel when the terminal connector is not properly connected to the connection terminal. The presence of a series arc is accompanied by consumption interruptions of short duration due to nuisance openings of the electric circuit.

Each type of arc comprises a particular electric current signature.

As represented in FIG. 1, the presence of a guillotine arc is characterized by the appearance on the electric current curve, on each mains half-wave, of a centred lobe the two ends whereof are flattened. Experts call this type of curve a flat zero crossing curve.

The presence of a saline arc is characterized by the appearance of a succession of current peaks located randomly in time. The current pulses occur at each drop, which results in a violent discharge in the saline solution. FIG. 2 represents current peaks of medium intensity obtained when the path taken by the arc contains elements that limit the intensity of the arcing current. This is the case when pollution is observed on the conductor. FIG. 3 represents current peaks of very strong intensity obtained when the path taken by the arc does not contain elements that limit the intensity of the arcing current. In the course of time, the frequency of the discharges speeds up until a continuous arc is reached which has the result of destroying the wires. A current curve as represented in FIG. 4 is then obtained.

FIG. 5 represents a current curve obtained in the presence of a chafing arc. The shape of the current curve alternates in random manner between a sine curve and a flat zero crossing curve.

FIGS. 6 and 7 represent current curves obtained in the presence of series arcs. FIG. 6 represents a current curve when the number of nuisance openings is low. FIG. 7 represents a current curve when the number of nuisance openings is high.

Existing detection techniques can be efficient for arcs producing currents of strong intensity, mainly guillotine arcs, chafing arcs and saline arcs of strong intensity.

Among existing techniques, some proceed with frequency domain analysis of the electric current signals. These detection methods are generally sensitive to high/microwave frequency HF noise caused by external disturbances such as in particular radiofrequencies, radars or switching power supplies. False alarms are liable to be observed and may cause nuisance tripping. These disturbance phenomena are particularly present for any analysis of frequencies above 100 kHz.

Other techniques perform point by point discrimination of the electric current signal. These methods impose the use of a digital technology, high processing and acquisition rates and a high computing power.

Certain methods analyze the variations of the value of the electric current by derivation. These methods only enable high-energy arcs to be detected. Moreover, these methods also present the risk of being sensitive to external HF disturbances.

Certain methods analyze the variations of the value of the electric current by integration. These methods are then less sensitive to external HF disturbances. To optimize the processing resolution, the electric current signal is filtered to eliminate the fundamental frequency of the signal. This resolution gain is really beneficial when the electric signal is close to a sine wave. For high-energy electric arcs, eliminating the fundamental frequency is penalizing as said fundamental frequency contains the information enabling the signature of this type of arc to be recognized. Moreover, the processing means, in particular those used for filtering or for storing the portion of signal give rise to additional production costs.

SUMMARY OF THE INVENTION

The object of the invention is therefore to remedy the shortcomings of the state of the technique so as to propose an arc detection device in an electrical installation that is efficient whatever the energy level of the electric arc and which only requires little computing and processing means.

The decision-making means of the detection device according to the invention comprise a disable unit supplying adaptive disable signals, detection means designed to each supply at least one decision-making aid signal according to at least one adaptive disable signal and to the current differential signal or the current integration signal. The decision-making means comprise a decision-making unit designed to supply at least one trip signal according to the value of decision-making aid signals.

Advantageously, the sequencing signal is synchronized with the AC voltage zero crossing.

According to one embodiment of the invention, a first adaptive disable signal is active when the sequencing signal is no longer synchronized on the zero crossing of the AC voltage.

According to one embodiment of the invention, a second adaptive disable signal is active when the current differential signal follows the same variation as the differential voltage signal during a current analysis period.

According to one embodiment of the invention, a third adaptive disable signal is active when the current differential signal decreases to a zero value after it has undergone a sharp increase.

According to one embodiment of the invention, a fourth adaptive disable signal is active when the AC current is of asymmetric shape with respect to a zero current line, the asymmetric tending to decrease to cancel out.

According to one embodiment of the invention, a fifth adaptive disable signal is active when a decrease of the current differential signal is greater than the mean value of the current integration signal.

According to one embodiment of the invention, a first detection means designed to detect electric arcs of very strong intensity supplies a first decision-making aid signal if, over a first analysis period, the current integration signal is higher than a saturation threshold at least once, and the first adaptive disable signal is inactive.

Advantageously, the first detection means comprise first storage means counting the number of times the current integration signal is higher than the saturation threshold.

Preferably, the first detection means supply a first decision-making aid signal if the number of times the current integration signal is higher than the saturation threshold is greater than a first counting threshold.

Preferably, the duration of the first analysis period is comprised between 0 and 0.2 seconds.

According to one embodiment of the invention, a second detection means designed to detect electric arcs of very strong intensity supplies a second decision-making aid signal if, over a second analysis period, the current differential signal is successively higher than an absolute threshold at least once, increasing with a higher variation rate than a relative variation threshold. The first, second, third and fourth adaptive disable signals are inactive.

Advantageously, the second detection means comprise second storage means counting the number of times the current differential signal is successively higher than the absolute threshold, and is then increasing with a higher variation rate than the relative variation threshold.

Preferably, the second detection means supply a second decision-making aid signal if the number of times the current differential signal is successively higher than the absolute threshold, and is then increasing with a higher variation rate than a relative variation threshold, is higher than a second counting threshold.

Preferably, the duration of the second analysis period is comprised between 0 and 0.2 seconds.

According to an embodiment of the invention, a third detection means designed to detect saline arcs of medium intensity supplies a third decision-making aid signal if, over a third analysis period, the current differential signal is higher than a first saline threshold at least once, while at the same time not having been lower than a first series threshold during the previous two half-waves of the AC current. The first, second, third and fourth adaptive disable signals are inactive.

Advantageously, the third detection means comprise third storage means counting the number of times the current differential signal is higher than the first saline threshold, while at the same time not having been lower than a first series threshold during the previous two half-waves of the AC current.

Preferably, the third detection means supply a third decision-making aid signal if the number of times the current differential signal is higher than the first saline threshold, while at the same time not having been lower than a first series threshold during the previous two half-waves of the AC current, is higher than a third counting threshold.

Preferably, the duration of the third analysis period is comprised between 0 and 0.2 seconds.

According to an embodiment of the invention, a fourth detection means designed to detect series arcs occurring in a circuit with a large number of current interruptions supplies a fourth decision-making aid signal if, over a fourth analysis period, the current differential signal is lower than a first series threshold at least once, while at the same time not having been higher than a first saline threshold during the previous two half-waves of the AC current. The first, second, third and fourth adaptive disable signals are inactive.

Advantageously, the fourth detection means comprise fourth storage means counting the number of times the current differential signal is lower than the first series threshold, while at the same time not having been higher than the first saline threshold during the previous two half-waves of the AC current.

Preferably, the fourth detection means supply a fourth decision-making aid signal if the number of times the current differential signal is lower than the first series threshold, while at the same time not having been higher than the first saline threshold during the previous two half-waves of the AC current, is higher than a fourth counting threshold.

Preferably, the duration of the fourth analysis period is comprised between 0 and 0.2 seconds.

According to an embodiment of the invention, a fifth detection means designed to detect saline arcs of strong intensity supplies a fifth decision-making aid signal if, over a fifth analysis period, the current differential signal successively undergoes at least once, a first very sharp increase where said signal is higher than a second saline threshold, a second increase that is less sharp than the first increase where said signal is lower than a third saline threshold, a sharp decrease where said signal is lower than a fourth saline threshold, the second saline threshold being higher than or equal to the third saline threshold and the third saline threshold being higher than the fourth saline threshold, the first adaptive disable signal being inactive.

Advantageously, the fifth detection means comprise fifth storage means containing the number of times the current differential signal successively undergoes a first very sharp increase where said signal is higher than a second saline threshold, a second less sharp increase where said signal is lower than a third saline threshold, and a sharp decrease where said signal is lower than a fourth saline threshold.

Preferably, the fifth detection means supply a fifth decision-making aid signal if the number of times the current differential signal successively undergoes a first very sharp increase where said signal is higher than a second saline threshold, a second less sharp increase where said signal is lower than a third saline threshold, and a sharp increase where said signal is lower than a fourth saline threshold, is greater than a fifth counting threshold.

Preferably, the duration of the fifth analysis period is comprised between eight and twelve seconds.

According to an embodiment of the invention, a sixth detection means designed to detect series arcs occurring in a circuit with few current interruptions supplies a sixth decision-making aid signal if, over a sixth analysis period, the current differential signal successively undergoes, at least once, a first very sharp decrease where said signal is lower than a second series threshold, a second decrease that is less sharp than the first decrease where said signal is higher than a third series threshold, a sharp increase where said signal is higher than a fourth series threshold, the second series threshold being lower than or equal to the third series threshold and the third series threshold being lower than the fourth series threshold. The first and fifth disable signals are inactive.

Advantageously, the sixth detection means comprise sixth storage means counting the number of times the current differential signal successively undergoes a first very sharp decrease where said signal is lower than a second series threshold, a second less sharp decrease where said signal is higher than a third series threshold, and a sharp increase where said signal is higher than a fourth series threshold.

Preferably, the sixth detection means supply a sixth decision-making aid signal if the number of times the current differential signal successively undergoes a first very sharp decrease where said signal is lower than a second series threshold, a second less sharp decrease where said signal is higher than a third series threshold, and a sharp increase where said signal is higher than a fourth series threshold, is greater than a sixth counting threshold.

Preferably, the duration of the sixth analysis period is comprised between a half a second and a second and a half.

In a particular embodiment, analyzing means comprise means for determining the maximum value of the AC current, at the rhythm of a sequencing signal.

Advantageously, the detection device comprises means for sampling the measured current and voltage signals and comprises means for storing said sampled signals.

Advantageously, the detection device comprises means for sampling the current and voltage integration signals and comprises means for storing said sampled signals.

Preferably, operation of each means for computing the current and voltage integration and differential signals is synchronized with sending of the sequencing signal.

Preferably, operation of each detection means is synchronized with sending of the sequencing signal.

The invention relates to a switchgear device comprising an electric contact opening mechanism and a control relay connected to a detection device as defined above. The control relay is designed to receive at least one trip signal from the decision-making means of the detection device.

The method for detecting an electric arc according to the invention comprises supply of a trip signal dependent on the value of decision-making aid signals, each decision-making aid signal being determined according to supply of at least one adaptive disable signal and of the current differential signal or the current integration signal.

Advantageously, the method for detecting an arc synchronizes the sequencing signal with zero crossing of the AC voltage.

According to an embodiment of the invention, the method comprises supply of a first active adaptive disable signal when the sequencing signal is no longer synchronized on zero crossing of the AC voltage.

According to an embodiment of the invention, the method comprises supply of a second active adaptive disable signal when the current differential signal follows the same variation as the voltage differential signal throughout the duration of a current analysis period.

According to an embodiment of the invention, the method comprises supply of a third active adaptive disable signal when the current differential signal decreases to a zero value after undergoing a sharp increase.

According to an embodiment of the invention, the method comprises supply of a fourth active adaptive disable signal when the AC current is of asymmetric shape with respect to a zero current line, the asymmetric tending to decrease to cancel out.

According to an embodiment of the invention, the method comprises supply of a fifth active adaptive disable signal when a decrease of the current differential signal is greater than the mean value of the current integration signal.

According to an embodiment of the invention, the method comprises supply of a first decision-making aid signal if, over a first analysis period, the current integration signal is higher than a saturation threshold at least once. The first adaptive disable signal is inactive.

According to an embodiment of the invention, the method comprises supply of a second decision-making aid signal if, over a second analysis period, the current differential signal is successively higher than an absolute threshold, at least once, crossing with a higher variation rate than a relative variation threshold. The first, second, third and fourth adaptive disable signals are inactive.

According to an embodiment of the invention, the method comprises supply of a third decision-making aid signal if, over a third analysis period, the current differential signal is higher than a first saline threshold, at least once, while at the same time not having been lower than a first series threshold during the previous two half-waves of the AC current. The first, second, third and fourth adaptive disable signals are inactive.

According to an embodiment of the invention, the method comprises supply of a fourth decision-making aid signal if, over a fourth analysis period, the current differential signal is lower than a first series threshold, at least once, while at the same time not having been higher than a first saline threshold during the previous two half-waves of the AC current. The first, second, third and fourth adaptive disable signals are inactive.

According to an embodiment of the invention, the method comprises supply of a fifth decision-making aid signal if, over a fifth analysis period, the current differential signal successively undergoes, at least once, a first very sharp increase where said signal is higher than a second saline threshold, a second increase that is less sharp than the first increase where said signal is lower than a third saline threshold, and a sharp decrease where said signal is lower than a fourth saline threshold. The second saline threshold is higher than or equal to the third saline threshold and the third saline threshold is higher than the fourth saline threshold. The first adaptive disable signal is inactive.

According to an embodiment of the invention, the method comprises supply of a sixth decision-making aid signal if, over a sixth analysis period, the current differential signal successively undergoes at least once a first very sharp decrease where said signal is lower than a second series threshold, a second decrease that is less sharp than the first decrease where said signal is higher than a third series threshold, and a sharp increase where said signal is higher than a fourth series threshold. The second series threshold being lower than or equal to the third series threshold and the third series thresholds being lower than the fourth series threshold. The first and fifth adaptive disable signals are inactive.

BRIEF DESCRIPTION OF THE DRAWINGS

Other advantages and features will become more clearly apparent from the following description of particular embodiments of the invention given as non-restrictive examples only and represented in the accompanying drawings in which.

DETAILED DESCRIPTION OF AN EMBODIMENT

Figure 1:
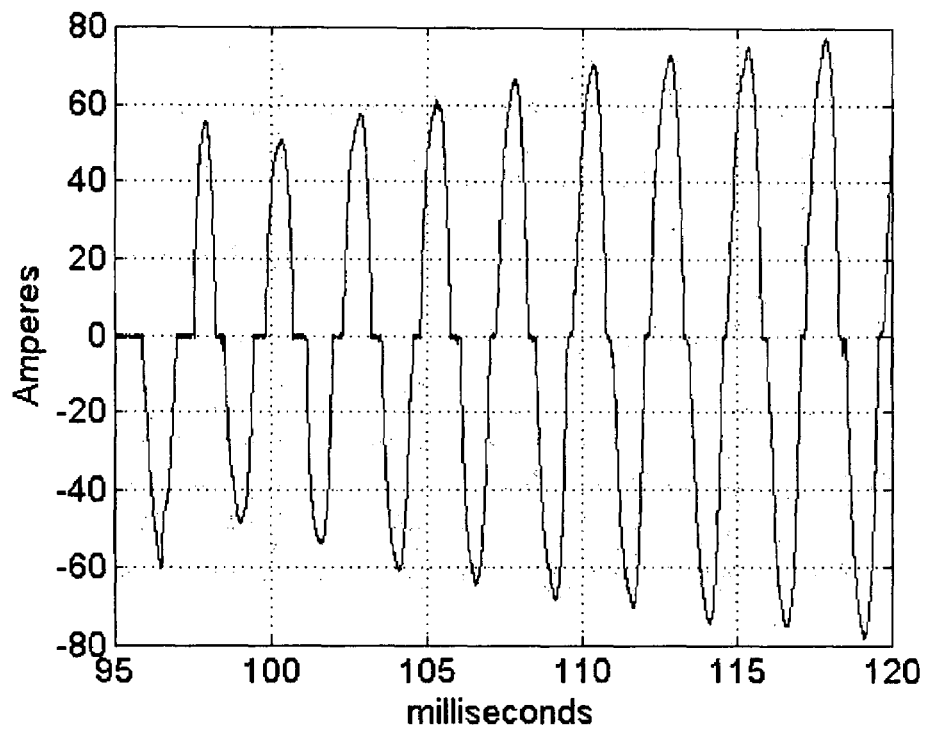
FIG. 1 represents a curve representative of an electric current in the presence of a parallel electric arc of "guillotine" type.
Figure 2:
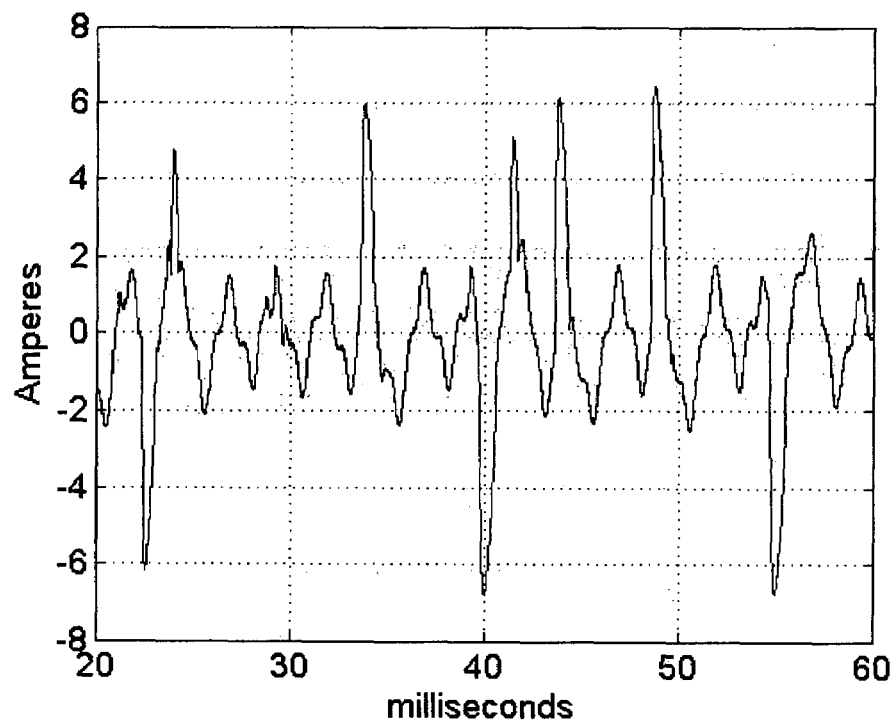
FIGS. 2 to 4 respectively represent a curve representative of an electric current in the presence of a parallel electric arc of "saline" type.
Figure 3:
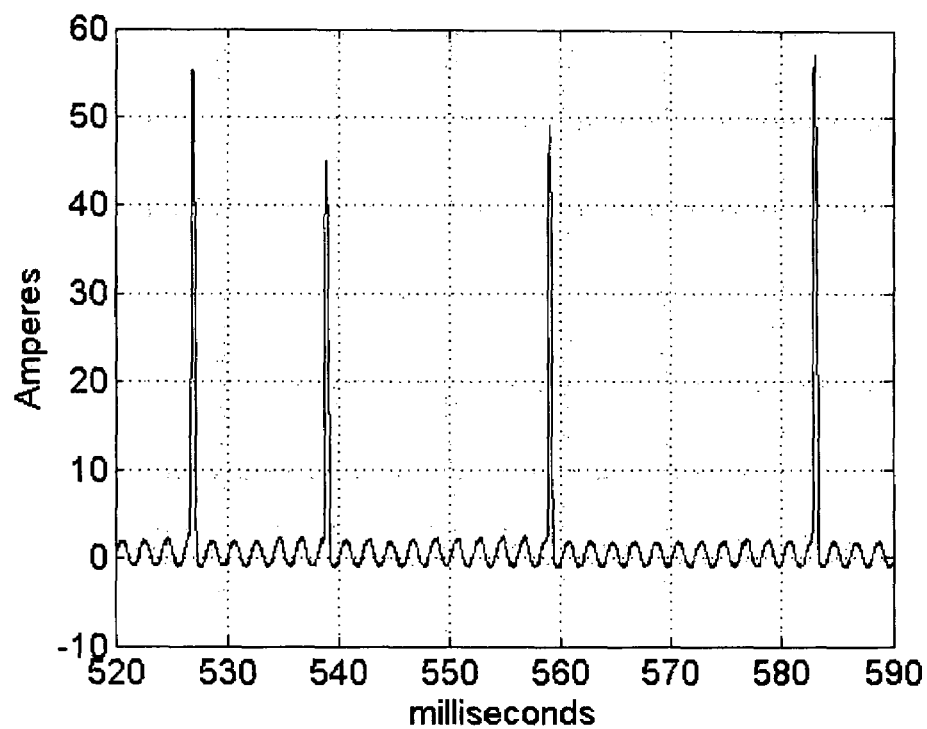
Figure 4:
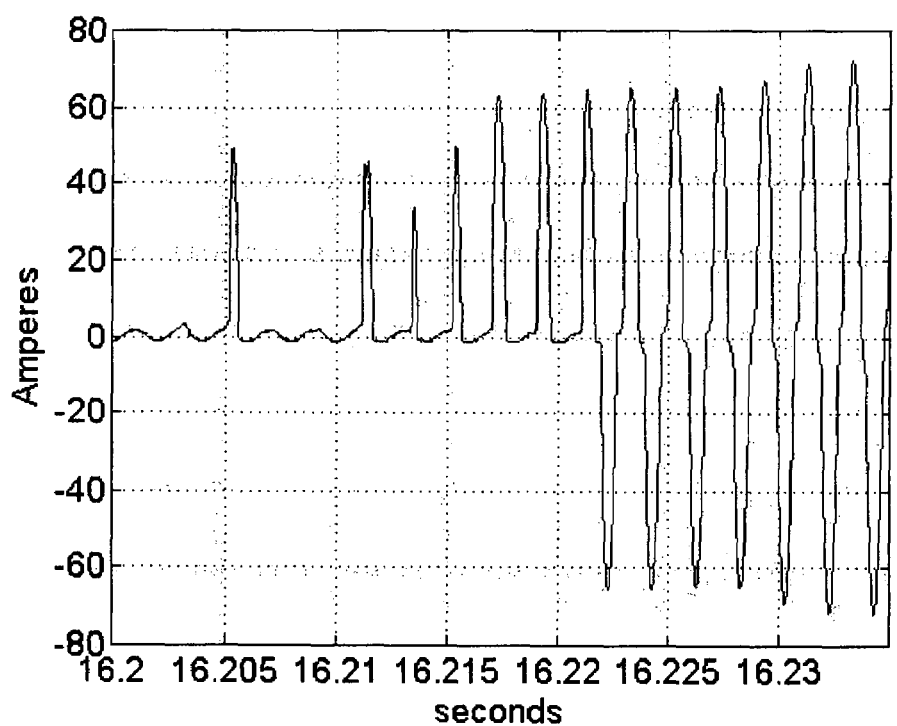
Figure 5:
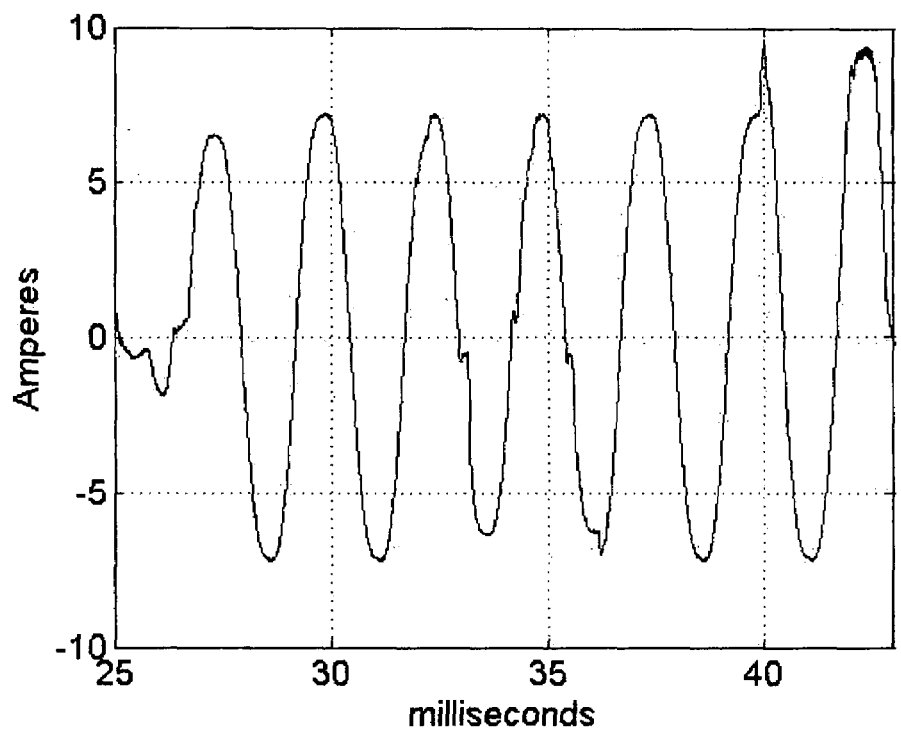
FIG. 5 represents a curve representative of an electric current in the presence of a parallel electric arc of "chafing" type.
Figure 6:
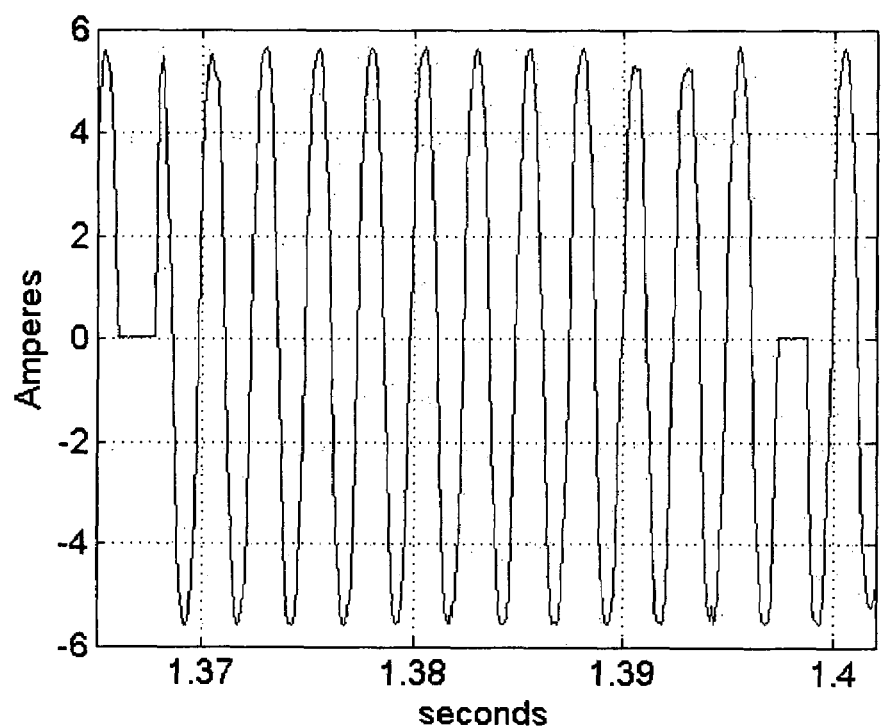
FIGS. 6 and 7 respectively represent a curve representative of an electric current in the presence of a "series" electric arc in a slightly disturbed circuit and a greatly disturbed circuit.
Figure 7:
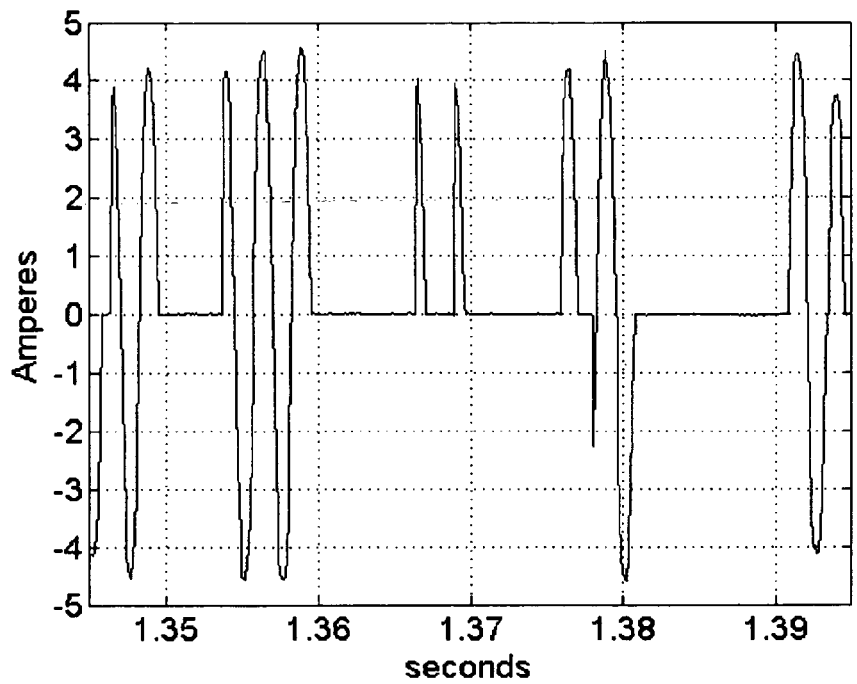
Figure 8:
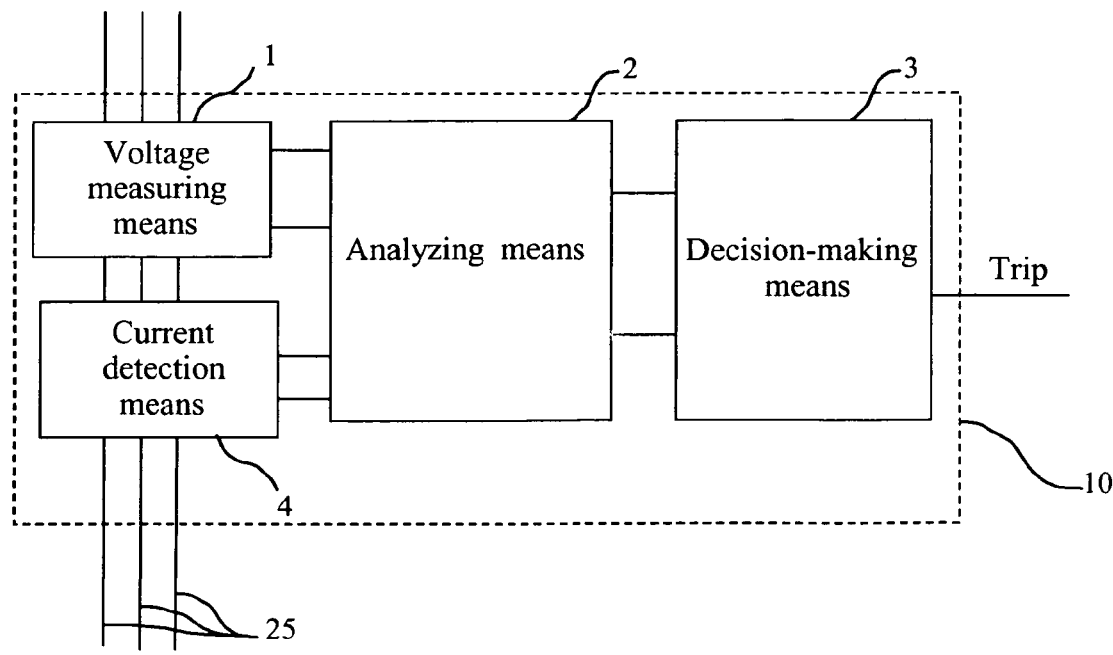
FIG. 8 represents the block diagram of the detection device according to an embodiment of the invention.

With reference to FIG. 8, an electric arc detection device 10 according to an embodiment of the invention comprises measuring means 4 of an AC current I flowing in the electric lines or conductors 25. The electric arc detection device 10 further comprises measuring means 1 of an AC voltage U.

Said measuring means 1, 4 are connected to analyzing means 2 connected to decision-making means 3. The decision-making means 3 are designed to supply at least one trip signal Trip. Said analyzing means highlight the signatures of the electric arcs.

Figure 10:
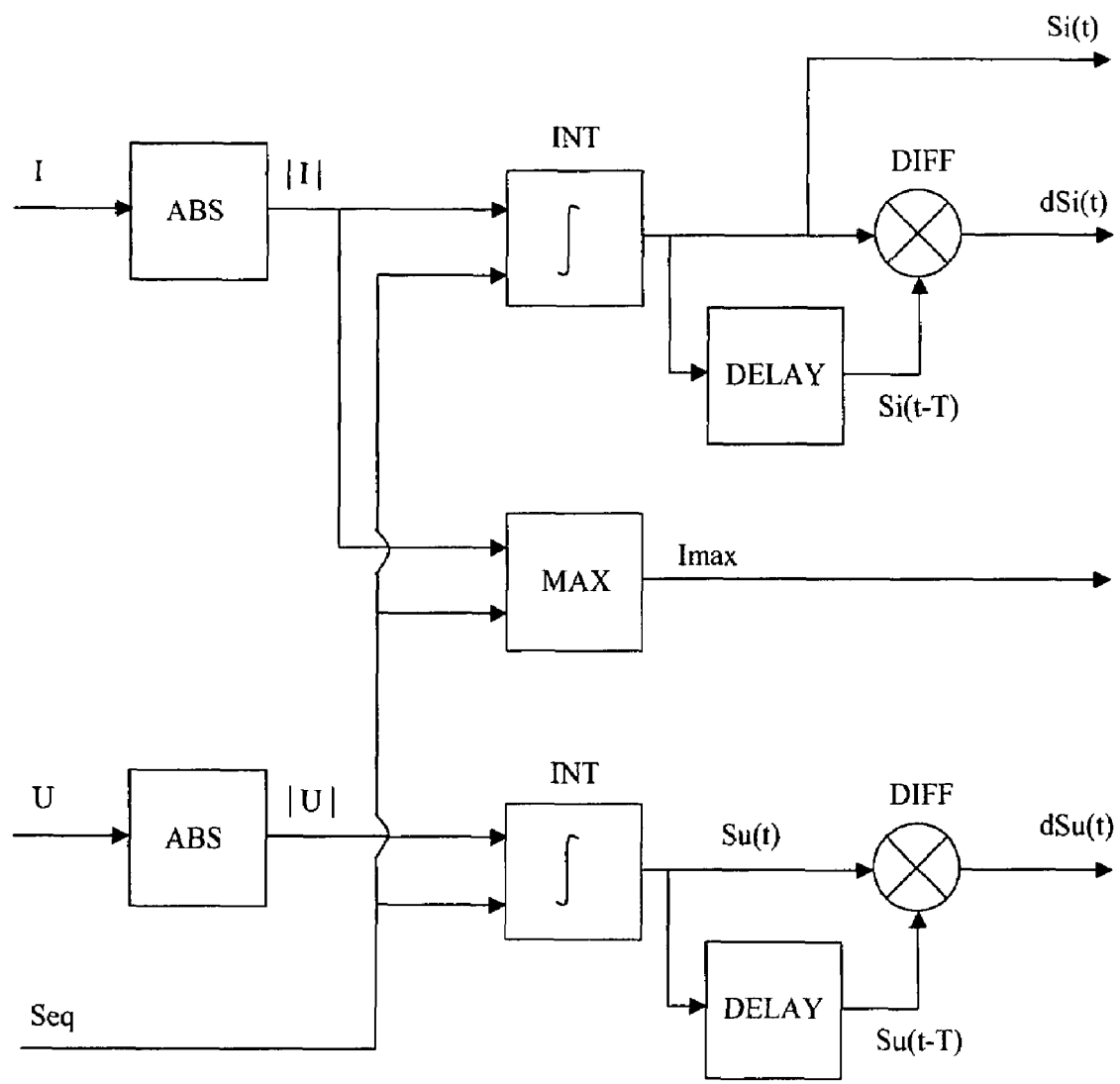
FIG. 10 represents a schematic view of the analyzing means according to FIG. 9.

As represented in FIG. 10, the analyzing means 2 comprise computing means designed to compute, at the rhythm of a sequencing signal Seq, an integral INT of an absolute value ABS of the AC current I over at least one mains half-wave, and to supply a current integration signal If(t).

The analyzing means 2 also comprise computing means designed to compute, at the rhythm of a sequencing signal Seq, an integral INT of an absolute value ABS of the AC voltage U over at least one mains half-wave, and to supply a voltage integration signal Su(t).

The analyzing means 2 comprise a means for determining the maximum value MAX of the AC current I, at the rhythm of a sequencing signal Seq.

The analyzing means 2 further comprise differentiation means DIFF supplying a current differential signal dSi(t) representative of the difference between a first current integration signal If(t) and a second current integration signal If(t-T) measured over a period T before said first integration signal. The differentiation means DIFF also supply a voltage differential signal dSu(t) representative of the difference between a first voltage integration signal Su(t) and a second voltage integration signal Su(t-T) measured over a period T before said first integration signal.

The sequencing signal Seq is supplied by a synchronization unit SYNCHRO. According to an embodiment of the invention, the sequencing signal Seq is preferably synchronized with zero crossing of the measured AC voltage U. All the analyzed quantities are therefore recomputed, after being stored, at each new half-wave of the electric power system voltage. In a particular embodiment, synchronization of the sequencing signal with zero crossing of the electric power system voltage is obtained with a phase lock loop.

The detection device 10 comprises means for sampling the current integration signal If(t) and voltage integration signal Su(t) and comprises means for storing said sampled signals.

Preferably, the sampling means sample measurement of an electric current I in an electric installation and measurement of the voltage U of the electric power system. The analyzing means comprise digital means, with rate control by a sequencing signal Seq, for computing the surface of the sampled current and voltage, for seeking the maximum value of the sampled current and computing the surface variation of the current and voltage.

In a second particular embodiment, the sampling means sample the surface and surface variation signals of the current, of the voltage and of the maximum current. The analyzing means 2 comprise digital means, with rate control by a sequencing signal Seq, for computing the surface of the measured current and voltage, for seeking the maximum current value and for computing the surface variation.

Figure 9:
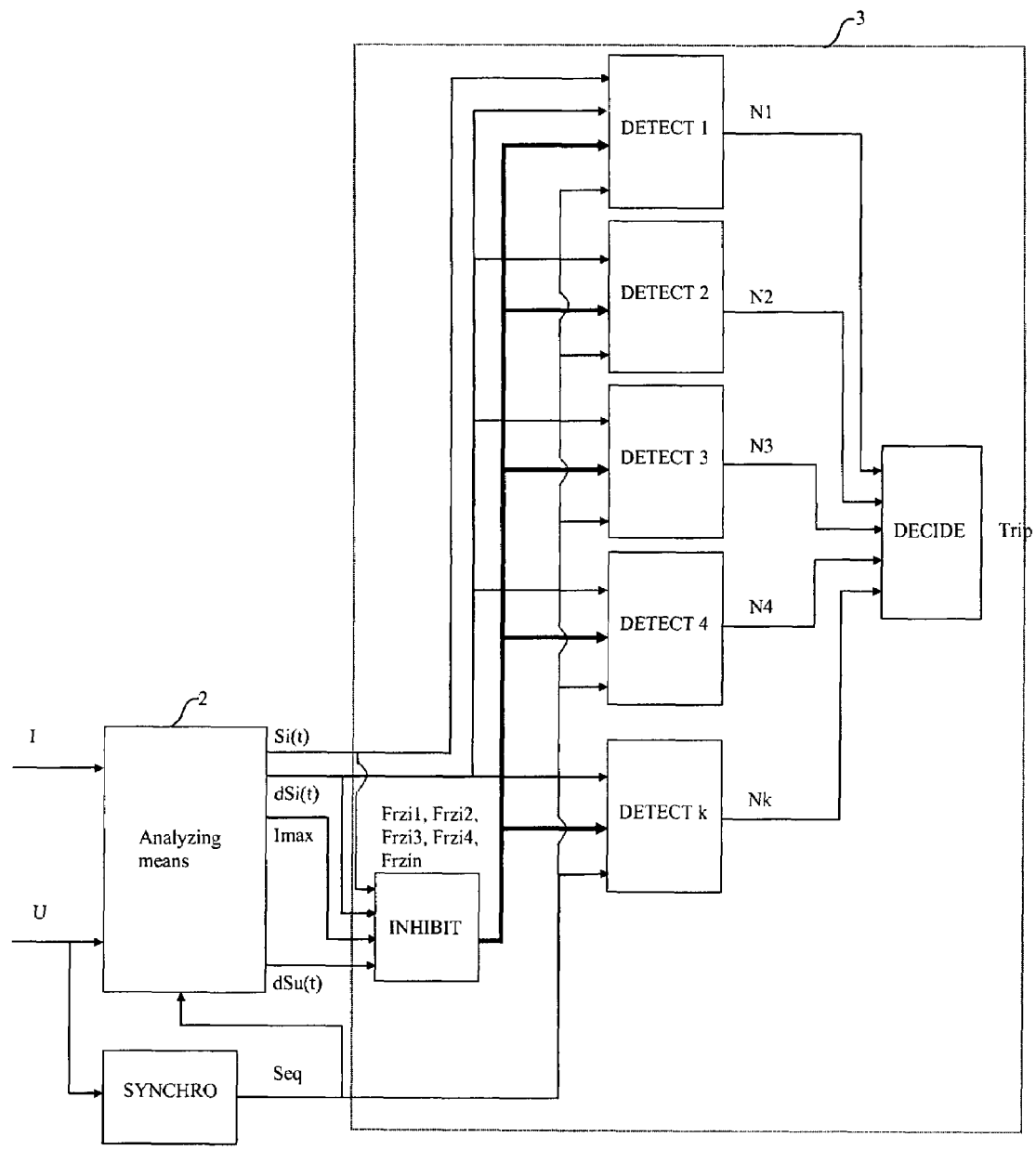
FIG. 9 represents a schematic view of the analyzing means and of the decision-making means of the detection device according to FIG. 8.

As represented in FIG. 9, the decision-making means 3 comprise a disable unit INHIBIT supplying one or more adaptive disable signals Frzi1, Frzi2, Frzi3, . . . , Frzin.

We speak of adaptive disable signals on account of the fact that each disable signal is supplied according to a specific operating situation. This operating situation is dependent on the current and voltage conditions measured during a period. Each adaptive disable signal can take at least two values—a first value for which the adaptive disable signal is said to be active and a second value for which the adaptive disable signal is said to be inactive. When the adaptive disable signal is active, the detection device 10 cannot send a trip signal Trip, and the detection device 10 is therefore disabled.

The disable unit INHIBIT supplies one or more active adaptive disable signals when there are disturbances on the power system due, in particular, to a change of the electric power generating equipment operating conditions. The disable unit INHIBIT also supplies an adaptive disable signal after it has detected start-up of inductive loads and of rotating machines, or a change of the load conditions on rotating machines in operation. Moreover, the disable unit INHIBIT also supplies an active adaptive disable signal on a loss of sequencing signal synchronization with the zero crossings of the electric power system voltage and/or fast and repetitive switching of complex loads.

Without this recognition by the disable unit INHIBIT, all these operating situations could be seen in certain cases as operating faults and could give rise to false alarms.

A first active adaptive disable signal Frzi1 is supplied when the sequencing signal Seq is no longer synchronized on zero crossing of the AC voltage U. This loss of synchronization is detected when the frequency of the sequencing signal is outside the frequency range that characterizes an electric power system; for example plus or minus 5 Hz for a fixed frequency power system equal to 400 Hz and from 360 Hz to 800 Hz for a variable frequency power system.

Furthermore, a loss of synchronization is detected when the frequency of the sequencing signal is below a required precision level, for example 5%.

A second active adaptive disable signal Frzi2 is supplied when the current differential signal dSi(t) follows the same variation as the voltage differential signal dSu(t) during a current analysis period.

A third active adaptive disable signal Frzi3 is supplied when the current differential signal dSi(t) decreases to a zero value, after having undergone a sharp increase. These variations occur during a specific current analysis period. This type of signature is typical of start-up of an inductive load such as a motor. The duration of the current differential signal dSi(t) decrease analysis period is preferably strictly longer than three mains half-waves. This minimum time is necessary to compute the current differential signal dSi(t).

Furthermore, the current differential signal dSi(t) decrease analysis period can run over eight mains half-waves, corresponding to the speed of decision required by the standard. According to this embodiment, the analysis period used preferably has a duration equal to five mains half-waves.

A fourth active adaptive disable signal Frzi4 is supplied by the disable unit INHIBIT when the AC current I has an asymmetric shape with respect to a current zero line, the asymmetry tending to decrease and to cancel out. This observation takes place during a current analysis period. This type of signature is typical of a switched rotating machine. The duration of the current differential signal dSi(t) decrease analysis period must be strictly greater than three mains half-waves. According to one embodiment, the analysis period used is equal to six mains half-waves. Furthermore, according to this embodiment the value of the maximum current Imax is preferably used for analysis of asymmetric shape of the electric current. This analysis could also be based on the value of the current integration signal If(t).

A fifth adaptive disable signal Frzi5 is active, during an analysis period of the current I, when the decrease of the current differential signal dSi(t) is greater than the mean value of the current integration signal If(t). The mean value of the current integration signal If(t) is computed at each cycle. According to this embodiment, the mean is computed on eight mains half-waves.

As represented in FIG. 9, the decision-making means 3 comprise one or more detection means DETECT1, DETECT2, DETECT3, DETECT4, . . . , DETECTk each designed to supply at least one decision-making aid signal N1, N2, N3, . . . , Nk according to at least one adaptive disable signal Frzi1, Frzi2, Frzi3, . . . , Frzin and according to the current differential signal dSi(t) or the current integration signal If(t). Operation of the detection means DETECT1, DETECT2, DETECT3, DETECT4, . . . , DETECTk is preferably synchronized with sending of the sequencing signal Seq.

The detection means DETECT1, DETECT2, DETECT3, DETECT4, . . . , DETECTk comprise comparing means for comparison with a threshold. The comparing means in particular compare a current differential dSi(t) or a differential of the current integration signal If(t) respectively with a threshold. The state of the signal on output from each comparator is stored at each new mains half-wave in dedicated storage and counting means. The storage time of each state on output from the comparator is preset for each storage means. The value contained in a counter is equal to the number of active states stored by the associated storage means. The content of each counter is transmitted to a decision-making aid signal.

The decision-making means 3 comprise a decision-making unit DECIDE designed to supply at least one trip signal Trip according to the value of the decision-making signals N1, N2, N3, . . . , Nk.

A first detection means DETECT1 is designed to detect electric arcs of very strong intensity. Said detection means supply a first decision-making aid signal N1 if, over a first analysis period W1, the current integration signal If(t) is higher than a saturation threshold SA at least once. In addition, the first adaptive disable signal Frzi1 is inactive. Each overshoot of the saturation threshold activates the comparator output. The state on output from the comparator is then stored for a preset time.

In a preferred embodiment, the first detection means DETECT1 comprise first storage means MEM1 counting the number of times the current integration signal If(t) is higher than the saturation threshold SA. The first decision-making aid signal N1 is then supplied if the number of times the current integration signal If(t) is higher than the saturation threshold SA is greater than a first counting threshold Sm1. In other words, the first decision-making aid signal N1 is then supplied if the value stored in MEM1 is greater than a first counting threshold Sm1.

The duration of the first analysis period W1 is comprised between 0 and 0.2 seconds. Preferably, the duration of the first analysis period W1 is dependent on the first counting threshold Sm1 and the electric power system frequency. For example, for a fixed power system frequency equal to 400 Hz, the duration of the first analysis period W1 is equal to the product between the value of the first counting threshold Sm1 and 1.25 ms, the product being at maximum equal to 0.1 seconds. For a variable power system frequency between 360 Hz and 800 Hz, the duration of the first analysis period W1 is equal to the product between the value of the first counting threshold Sm1 and 1.389 ms, the product being at maximum equal to 0.1 seconds.

A second detection means DETECT2 is designed to detect persistent electric arcs of strong intensity. Said detection means supply a second decision-making aid signal N2 if, over a second analysis period W2, the current differential signal dSi(t) is successively higher than an absolute threshold L1_absolute at least once, and is then increasing with a higher variation rate than a relative variation threshold L1_relative. The current surface variation is therefore compared with a threshold representative of a current "jump". Exceeding the threshold activates the comparator output. The state on output of the comparator is then stored for a preset time. Moreover, the state on output of the comparator activates a monitoring mechanism detecting increase of the current surface beyond a preset rate. Each overshoot of this rate activates a signal which is stored for a preset time. In addition, the second decision-making aid signal N2 is supplied if the first, second, third and fourth adaptive disable signals Frzi1, Frzi2, Frzi3, Frzi4 are all inactive.

In a preferred embodiment, the second detection means DETECT2 comprise second storage means MEM2 counting the number of times the current differential signal dSi(t) is successively higher than the absolute threshold L1_absolute, at least once, and is then increasing with a higher variation rate than the relative variation threshold L1_relative. The second decision-making aid signal N2 is then supplied if the number of times the current differential signal dSi(t) is successively higher than the absolute threshold L1_absolute, and is then increasing with a higher variation rate than the relative variation threshold L1_relative, is greater than a second counting threshold Sm2. In other words, the second decision-making aid signal N2 is then supplied if the value stored in MEM2 is greater than a second counting threshold Sm2.

The duration of the second analysis period W2 is comprised between 0 and 0.2 seconds. Preferably, the duration of the second analysis period W2 is dependent on the second counting threshold Sm2 and on the electric power system frequency. For example, for a fixed power system frequency equal to 400 Hz, the duration of the second analysis period W2 is equal to the product between the value of the second counting threshold Sm2 and 1.25 ms, the product being at maximum equal to 0.1 seconds. For a variable power system frequency between 360 Hz and 800 Hz, the duration of the second analysis period W2 is equal to the product between the value of the second counting threshold Sm2 and 1.389 ms, the product being at maximum equal to 0.1 seconds.

According to an embodiment of the second detection means DETECT2, interruptions in the increase of the current differential signal dSi(t), with a higher variation rate than a relative variation threshold L1_relative, are tolerated over less than four mains half-waves.

A third detection means DETECT3 is designed to detect saline arcs of medium intensity. Said detection means supply a third decision-making aid signal N3 if, over a third analysis period W3, the current differential signal dSi(t) is higher than a first saline threshold L5-1 at least once, while at the same time not having been lower than a first series threshold L6-1 during the previous two half-waves of the AC current. Thus, the current surface variation is compared with a positive threshold reflecting a current "jump", and with a negative threshold characterizing an interruption of consumption. A current "jump", without a consumption interruption during the previous two mains half-waves, activates a signal which is stored for a preset time. In addition, the third decision-making aid signal N3 is supplied if the first, second, third and fourth adaptive disable signals Frzi1, Frzi2, Frzi3, Frzi4 are all inactive.

In a preferred embodiment, the third detection means DETECT3 comprise third storage means MEM3 counting the number of times the current differential signal dSi(t) is higher than a first saline threshold L5-1 at least once, while at the same time not having been lower than a first series threshold L6-1. The third decision-making aid signal N3 is then supplied if the number of times the current differential signal dSi(t) is higher than a first saline threshold L5-1, while at the same time not having been lower than a first series threshold L6-1 during the previous two mains half-waves, is greater than a third counting threshold Sm3. In other words, the third decision-making aid signal N3 is then supplied if the value stored in MEM3 is greater than a third counting threshold Sm3.

The duration of the third analysis period W3 is comprised between 0 and 0.2 seconds. Preferably, the duration of the third analysis period W3 is dependent on the third counting threshold Sm3 and on the electric power system frequency. For example, for a fixed power system frequency equal to 400 Hz, the duration of the third analysis period W3 is equal to the product between the value of the third counting threshold Sm3 and 1.25 ms, the product being at maximum equal to 0.1 seconds. For a variable power system frequency between 360 Hz and 800 Hz, the duration of the third analysis period W3 is equal to the product between the value of the third counting threshold Sm3 and 1.389 ms, the product being at maximum equal to 0.1 seconds.

A fourth detection means DETECT4 is designed to detect series arcs occurring in a circuit with a large number of current interruptions. Said detection means supply a fourth decision-making aid signal N4 if, over a fourth analysis period W4, the current differential signal dSi(t) is lower than a first series threshold L6-1 at least once, while at the same time not having been higher than a first saline threshold L5-1 during the previous two half-waves of the AC current I. Thus, the current surface variation is compared with a negative threshold characterizing a consumption interruption, and with a positive threshold reflecting a current "jump". An interruption of consumption without a current "jump" during the previous two mains half-waves activates a signal which is stored for a preset time. In addition, the fourth decision-making aid signal N4 is supplied if the first, second, third and fourth adaptive disable signals Frzi1, Frzi2, Frzi3, Frzi4 are all inactive.

In a preferred embodiment, the fourth detection means DETECT4 comprise fourth storage means MEM4 counting the number of times the current differential signal dSi(t) is lower than a first series threshold L6-1 at least once, while at the same time not having been higher than a first saline threshold L5-1. The fourth decision-making aid signal N4 is then supplied if the number of times the current differential signal dSi(t) is lower than a first series threshold L6-1, while at the same time not having been higher than a first saline threshold L5-1, is greater than a fourth counting threshold Sm4. In other words, the fourth decision-making aid signal N4 is then supplied if the value stored in MEM4 is greater than a fourth counting threshold Sm4.

The duration of the fourth analysis period W4 is comprised between 0 and 0.2 seconds. Preferably, the duration of the fourth analysis period W4 is dependent on the counting threshold and on the electric power system frequency. For example, for a fixed power system frequency equal to 400 Hz, the duration of the fourth analysis period W4 is equal to the product between the value of the fourth counting threshold Sm4 and 1.25 ms, the product being at maximum equal to 0.1 seconds. For a variable power system frequency between 360 Hz and 800 Hz, the duration of the fourth analysis period W4 is equal to the product between the value of the fourth counting threshold Sm4 and 1.389 ms, the product being at maximum equal to 0.1 seconds.

A fifth detection means DETECT5 is designed to detect saline arcs of strong intensity. Said detection supply a fifth decision-making aid signal N5 if, over a fifth analysis period W5, the current differential signal dSi(t) successively undergoes, at least once, a first very sharp increase where said signal is higher than a second saline threshold L5-2, and then a second increase that is less sharp than the first increase, where said signal is lower than a third saline threshold L5-3, and finally a sharp decrease where said signal is lower than a fourth saline threshold L5-4. The first adaptive disable signal Frz1 is in addition inactive. The second saline threshold L5-2 is higher than or equal to the third saline threshold L5-3 and said third saline threshold is higher than the fourth saline threshold L5-4. Thus, the surface variation is compared with a positive threshold reflecting a current "jump" of strong intensity, and with a negative threshold characterizing a current drop of strong intensity. A current "jump" on the first mains half-wave followed by an almost stable current intensity on the second half-wave, and then terminated by current drop on the third half-wave, activates a signal which is stored for a preset time.

In a preferred embodiment, the fifth detection means DETECT5 comprise fifth storage means MEM5 counting the number of times the current differential signal dSi(t) successively undergoes a first very sharp increase where said signal is higher than a second saline threshold L5-2, a second increase where said signal is lower than a third saline threshold L5-3, and a sharp decrease where said signal is lower than a fourth saline threshold L5-4. The fifth decision-making aid signal N5 is then supplied if the number of times the current differential signal dSi(t) successively undergoes a first very sharp increase where said signal is higher than a second saline threshold L5-2, a second less sharp increase where said signal is lower than a third saline threshold L5-3, and a sharp decrease where said signal is lower than a fourth saline threshold L5-4, is greater than a fifth counting threshold Sm5. In other words, the fifth decision-making aid signal N5 is then supplied if the value stored in MEM5 is greater than a fifth counting threshold Sm5. The duration of the fifth analysis period W5 is comprised between eight and twelve seconds.

A sixth detection means DETECT6 is designed to detect series arcs occurring in a circuit with few current interruptions. A sixth detection means DETECT6 can supply a sixth decision-making aid signal N6 if, over a sixth analysis period W6, the current differential signal dSi(t) successively undergoes, at least once, a first very sharp decrease where said signal is lower than a second series threshold L6-2, followed by a second decrease that is less sharp than the first decrease, where said signal is higher than a third series threshold L6-3, and finally a sharp increase where said signal is higher than a fourth series threshold L6-4. Moreover, the first and fifth adaptive disable signals Frz1, Frz5 are inactive. The second series threshold L6-2 is lower than or equal to the third series threshold L6-3 and the third series threshold L6-3 is lower than the fourth series threshold L6-4. The surface variation is thus compared with a negative threshold characterizing an interruption of consumption, and with a positive threshold characterizing a resumption of consumption. A consumption interruption on the first mains half-wave followed by an almost stable current intensity on the second half-wave, and then terminated by a resumption of consumption on the third half-wave activates a signal which is stored for a preset time.

In a preferred embodiment, the sixth detection means DETECT6 comprise sixth storage means MEM6 counting the number of times the current differential signal dSi(t) successively undergoes a first very sharp decrease where said signal is lower than a second series threshold L6-2, a second less sharp decrease where said signal is higher than a third series threshold L6-3, and a sharp increase where said signal is higher than a fourth series threshold L6-4. The sixth decision-making aid signal N6 is then supplied if the number of times the current differential signal dSi(t) successively undergoes a first very sharp decrease where said signal is lower than a second series threshold L6-2, a second less sharp decrease where said signal is higher than a third series threshold L6-3, and a sharp increase where said signal is higher than a fourth series threshold L6-4, is greater than a sixth counting threshold Sm6. In other words, the sixth decision-making aid signal N6 is then supplied if the value stored in MEM6 is greater than a sixth counting threshold Sm6. The duration of the sixth analysis period W6 is comprised between a half a second and a second and a half.

The decision-making means 3 determine the moment when the electric installation is to be interrupted, according to the state of the decision-making signals N1, N2, N3, . . . , Nn, in particular by supplying a trip signal Trip.

Figure 11:
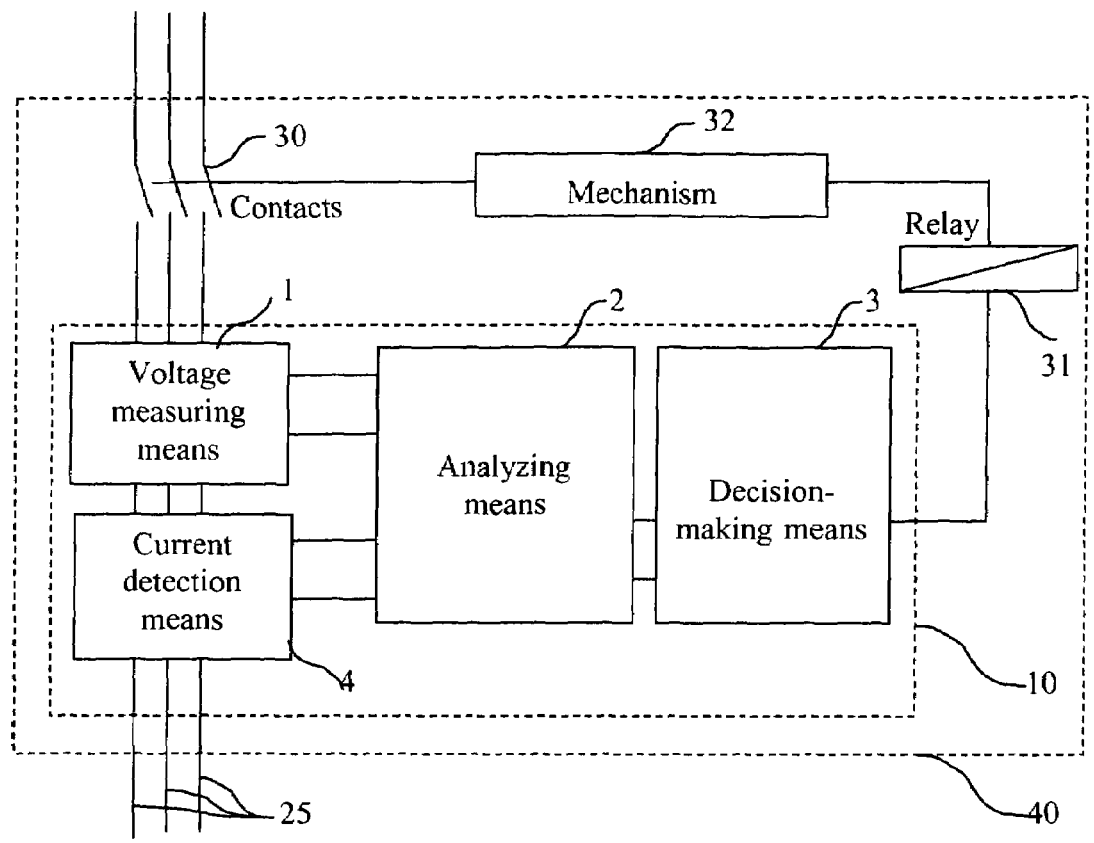
FIG. 11 represents the block diagram of the protection device comprising a detection device according to an embodiment of the invention.

As represented in FIG. 11, the detection device 10 is particularly designed for a switchgear device 40, such as a circuit breaker or a switch. Said switchgear device 40 comprises an opening mechanism 32 for opening electric contacts 30 placed in series on electric lines or conductors 25. The switchgear device also comprises a control relay 31 connected to the detection device as defined above. The control relay 31 is designed to receive at least one trip signal Trip from the decision-making means 3 of the detection device 10. The trip signal Trip causes opening of the electric contacts 30 in the event of an electric fault being observed. The switchgear device 40 can comprise thermal detection means and/or electromagnetic detection means. According to an alternative embodiment, the switchgear device 40 also comprises electronic detection and tripping means.

In a particular embodiment, breaking is achieved by means of an electromagnetic actuator in direct connection with the contact opening mechanism. In a second particular embodiment, breaking is achieved with a power electronic device.

The invention relates to a method for detecting an arc implementing an arc detection device as described above.

Figure 12:
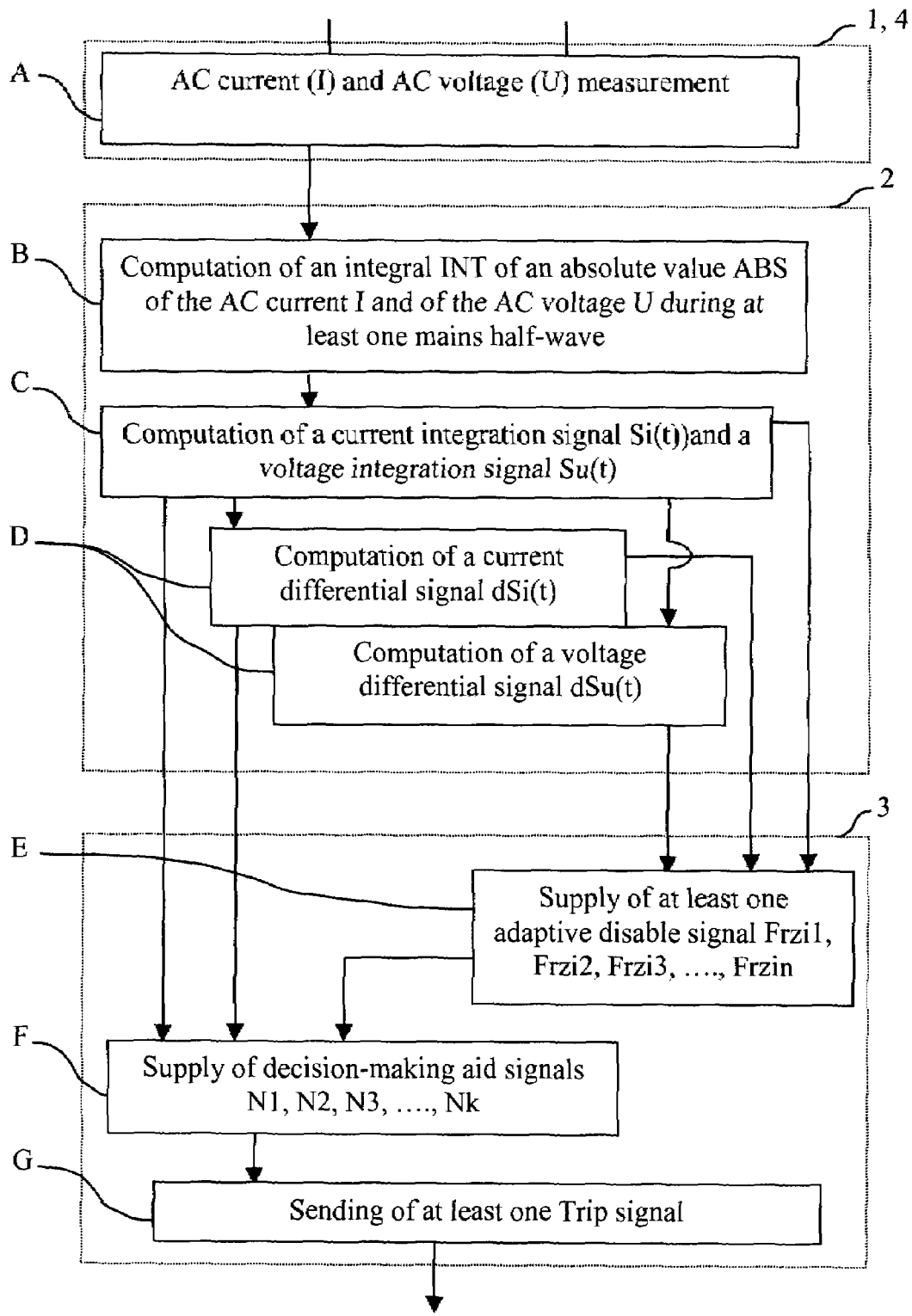
FIG. 12 represents an algorithm of operation of the arc detection device according to an embodiment of the invention.

As represented in FIG. 12, a first step A of the detection method consists in measuring an AC electric current I and an AC voltage U with measuring means 1, 4.

A second step B consists in supplying an integral INT of an absolute value ABS of the AC current I and of the AC voltage U over at least one mains half-wave, with computing means of the analyzing means 2, at the rhythm of a sequencing signal Seq.

A third step C of said method consists in supplying a current integration signal If(t) and a voltage integration signal Su(t).

According to a particular embodiment, the detection method preferably synchronizes the sequencing signal Seq with zero crossing of the AC voltage U.

A fourth step D of the method consists in supplying a current differential signal dSi(t) representative of the difference between a first current integration signal If(t) and a second current integration signal If(t-T) measured over a period T before said first integration signal. A voltage differential signal dSu(t) representative of the difference between a first voltage integration signal Su(t) and a second voltage integration signal Su(t-T) measured over a period T before said first integration signal, is also supplied.

Preferably, differentiation means DIFF supply a current differential signal dSi(t) and a voltage differential signal dSu(t)

A fifth step E consists in supply of one or more adaptive disable signal Frzi1, Frzi2, Frzi3, ..., Frzin by a disable unit INHIBIT of the analyzing means 2.

A fifth step F consists in supplying at least one decision-making aid signal N1, N2, N3, ..., Nk according to at least one adaptive disable signal Frzi1, Frzi2, Frzi3, ..., Frzin and to the current differential signal dSi(t) or the current integration signal If(t). The decision-making aid signals N1, N2, N3, ..., Nk are preferably supplied by the detection means DETECT1, DETECT2, DETECT3, DETECT4, ..., DETECTk.

The method for detecting an arc, in a last step G, comprises supply of a trip signal Trip. The trip signal Trip is preferably supplied by a decision-making unit DECIDE of the decision-making means 3. Said decision-making means 3 are connected to the analyzing means 2.

The method for detecting an arc supplies a first active adaptive disable signal Frz1 when the sequencing signal Seq is no longer synchronized on the zero crossing of the AC voltage U.

The method for detecting an arc supplies a first active adaptive disable signal Frzi2 when the current differential signal dSi(t) follows the same variation as the voltage differential signal dSu(t) during an analysis period of the current I.

The method for detecting an arc supplies a third active adaptive disable signal Frzi3 when the current differential signal dSi(t) decreases to a zero value after undergoing a sharp increase.

The method for detecting an arc supplies a fourth active adaptive disable signal Frzi4 when the AC current I is of asymmetric shape with respect to a zero current line, the asymmetric tending to decrease and then cancel out.

A fifth active adaptive disable signal Frzi5 is supplied when a decrease of the current differential signal dSi(t) is greater than the mean value of the current integration signal If(t).

The method for detecting an arc supplies a first decision-making aid signal N1 if, over a first analysis period W1, the current integration signal dSi(t) is higher than a saturation threshold SA at least once. The first decision-making aid signal N1 is supplied if the first adaptive disable signal Frzi1 is inactive.

The method for detecting an arc supplies a second decision-making aid signal N2 if, over a second analysis period W2, the current differential signal dSi(t) is successively higher than an absolute threshold L1_absolute at least once, increasing with a variation rate that is greater than a relative variation threshold L1_relative. The second decision-making aid signal N2 is supplied if the first, second, third and fourth adaptive disable signals Frzi1, Frzi2, Frzi3, Frzi4 are all inactive.

The method for detecting an arc supplies a third decision-making aid signal N3 if, over a third analysis period W3, the current differential signal dSi(t) is higher than a first saline threshold L5-1 at least once, while at the same time not having been lower than a first series threshold L6-1 during the previous two half-waves of the AC current. The first, second, third and fourth adaptive disable signals Frzi1, Frzi2, Frzi3, Frzi4 are also all inactive.

The method for detecting an arc supplies a fourth decision-making aid signal N4 if, over a fourth analysis period W4, the current differential signal dSi(t) is lower than a first series threshold L6-1 at least once, while at the same time not having been higher than a first saline threshold L5-1 during the previous two half-waves of the AC current. The first, second, third and fourth adaptive disable signals Frzi1, Frzi2, Frzi3, Frzi4 are also all inactive.

The method for detecting an arc supplies a fifth decision-making aid signal N5 if, over a fifth analysis period W5, the current differential signal dSi(t) successively undergoes at least once a first very sharp increase where said signal is higher than a second saline threshold L5-2, a second increase that is less sharp than the first increase where said signal is lower than a third saline threshold L5-3, and a sharp decrease where said signal is lower than a fourth saline threshold L5-4. The first adaptive disable signal Frzi1 is also inactive. The second saline threshold L5-2 is higher than or equal to the third saline threshold L5-3 and the third saline threshold L5-3 is higher than the fourth saline threshold L5-4.

The method for detecting an arc supplies a sixth decision-making aid signal N6 if, over a sixth analysis period W6, the current differential signal dSi(t) successively undergoes, at least once, a first very sharp decrease where said signal is lower than a second series threshold L6-2, a second decrease that is less sharp than the first decrease where said signal is higher than a third series threshold L6-3, and a sharp increase where said signal is higher than a fourth series threshold L6-4. In addition, the first and fifth adaptive disable signals Frzi1, Frzi5 are inactive. The second series threshold L6-2 is lower than or equal to the third series threshold L6-3 and the third series threshold L6-3 is lower than the fourth series threshold L6-4.

The invention claimed is:

1. Electric arc detection device comprising
measuring means for measuring an AC current and an AC voltage,
analyzing means connected to the measuring means, and comprising
computing means for computing, at the rhythm of a sequencing signal, an integral of an absolute value:
of the AC current over at least one mains half-wave and supplying a current integration signal,
of the AC voltage over at least one mains half-wave and supplying a voltage integration signal,
differentiation means supplying
a current differential signal representative of the difference between a first current integration signal and a second current integration signal measured over a period before said first integration signal,
a voltage differential signal representative of the difference between a first voltage integration signal and a second voltage integration signal measured over a period before said first integration signal,
decision-making means connected to the analyzing means and designed to send at least one trip signal,
wherein the decision-making means comprise:
a disable unit supplying adaptive disable signals,
detection means each designed to supply at least one decision-making aid signal according to:
at least one adaptive disable signal, and
the current differential signal or the current integration signal,
a decision-making unit designed to supply at least one trip signal according to the value of decision-making aid signals.

2. Detection device according to claim 1, comprising a synchronization unit synchronizing the sequencing signal with zero crossing of the AC voltage.

3. Detection device according to claim 2, wherein the disable unit supplies a first active adaptive disable signal when the sequencing signal is no longer synchronized on zero crossing of the AC voltage.

4. Detection device according to claim 1, wherein the disable unit supplies a second active adaptive disable signal when the current differential signal follows the same variation as the voltage differential signal throughout the duration of a current analysis period.

5. Detection device according to claim 1, wherein the disable unit supplies a third active adaptive disable signal when the current differential signal decreases to a zero value after undergoing a sharp increase.

6. Detection device according to claim 1, wherein the disable unit supplies a fourth active adaptive disable signal when the AC current is of asymmetric shape with respect to zero current line, the asymmetric tending to decrease and then cancel out.

7. Detection device according to claim 1, wherein the disable unit supplies a fifth active adaptive disable signal when a decrease of the current differential signal is greater than the means value of the current integration signal.

8. Detection device according to claim 3, wherein a first detection means designed to detect electric arcs of very strong intensity supplies a first decision-making aid signal if, over a first analysis period:
    the current integration signal is higher than a saturation threshold at least once, and
    the first adaptive disable signal is inactive.

9. Detection device according to claim 8, wherein the first detection means comprise first storage means counting the number of times the current integration signal is higher than the saturation threshold.

10. Detection device according to claim 9, wherein the first detection means supply a first decision-making aid signal if the number of times the current integration signal is higher than the saturation threshold is greater than a first counting threshold.

11. Detection device according to claim 8, wherein the duration of the first analysis period is comprised between 0 and 0.2 seconds.

12. Detection device according to claim 1, wherein a second detection means designed to detect electric arcs of strong intensity supplies a second decision-making aid signal if, over a second analysis period:
    the current differential signal is successively:
        higher than an absolute threshold at least once,
        increasing with a higher variation rate than a relative variation threshold, and
    the first, second, third and fourth adaptive disable signals are inactive.

13. Detection device according to claim 12, wherein the second detection means comprise second storage means counting the number of times the current differential signal is successively higher than the absolute threshold, and is then increasing with a higher variation rate than a relative variation threshold.

14. Detection device according to claim 13, wherein the second detection means supply a second decision-making aid signal if the number of times the current differential signal is successively higher than the absolute threshold, and is then increasing with a higher variation rate than a relative variation threshold, is greater than a second counting threshold.

15. Detection device according to claim 12, wherein the duration of the second analysis period is comprised between 0 and 0.2 seconds.

16. Detection device according to claim 1, wherein a third detection means designed to detect saline arcs of medium intensity supplies a third decision-making aid signal if, over a third analysis period:
    the current differential signal is higher than a first saline threshold at least once, while at the same time not having been lower than a first series threshold during the previous two half-waves of the AC current, and
    the first, second, third and fourth adaptive disable signals are inactive.

17. Detection device according to claim 16, wherein the third detection means comprise third storage means counting the number of times the current differential signal is higher than a first saline threshold, while at the same time not having been lower than a first series threshold during the previous two half-waves of the AC current.

18. Detection device according to claim 17, wherein the third detection means supply a third decision-making aid signal if the number of times the current differential signal is higher than a first saline threshold, while at the same time not having been lower than a first series threshold during the previous two half-waves of the AC current, is greater than a third counting threshold.

19. Detection device according to claim 16, wherein the duration of the third analysis period is comprised between 0 and 0.2 seconds.

20. Detection device according to claim 1, wherein a fourth detection means designed to detect series arcs occurring in a circuit with a large number of current interruptions supplies a fourth decision-making aid signal if, over a fourth analysis period:
    the current differential signal is lower than a first series threshold at least once, while at the same time not having been higher than a first saline threshold during the previous two half-waves of the AC current, and
    the first, second, third and fourth adaptive disable signals are inactive.

21. Detection device according to claim 20, wherein the fourth detection means comprise fourth storage means counting the number of times the current differential signal is lower than the first series threshold, while at the same time not having been higher than the first saline threshold during the previous two half-waves of the AC current.

22. Detection device according to claim 21, wherein the fourth detection means supply a fourth decision-making aid signal if the number of times the current differential signal is lower than the first series threshold, while at the same time not having been higher than the first saline threshold during the previous two half-waves of the AC current, is greater than a fourth counting threshold.

23. Detection device according to claim 20, wherein the duration of the fourth analysis period is comprised between 0 and 0.2 seconds.

24. Detection device according to claim 3, wherein a fifth detection means designed to detect saline arcs of strong intensity supplies a fifth decision-making aid signal if, over a fifth analysis period:
    the current differential signal successively undergoes at least once:
        a first very sharp increase where said signal is higher than a second saline threshold,
        a second increase that is less sharp than the first increase where said signal is lower than a third saline threshold,
        a sharp decrease where said signal is lower than a fourth saline threshold, the second saline threshold being higher than or equal to the third saline threshold and the third saline threshold being higher than the fourth saline threshold, and the first adaptive disable signal being inactive.

25. Detection device according to claim 24, wherein the fifth detection means comprise fifth storage means counting the number of times the current differential signal successively undergoes a first very sharp increase, where said signal is higher than a second saline threshold, a second less sharp increase where said signal is lower than a third saline threshold, and a sharp decrease where said signal is lower than a fourth saline threshold.

26. Detection device according to claim 25, wherein the fifth detection means supply a fifth decision-making aid signal if the number of times the current differential signal successively undergoes a first very sharp increase, where said signal is higher than a second saline threshold, a second less sharp increase where said signal is lower than a third saline threshold, and a sharp decrease where said signal is lower than a fourth saline threshold, is greater than a fifth counting threshold.

27. Detection device according to claim 24, wherein the duration of the fifth analysis period is comprised between eight and twelve seconds.

28. Detection device according to claim 3, wherein a sixth detection means designed to detect series arcs occurring in a circuit with few current interruptions supplies a sixth decision-making aid signal if, over a sixth analysis period, the current differential signal successively undergoes at least once:
a first very sharp decrease where said signal is lower than a second series threshold,
a second decrease that is less sharp than the first decrease, where said signal is higher than a third series threshold,
a sharp increase where said signal is higher than a fourth series threshold,
the second series threshold being lower than or equal to the third series threshold and the third series threshold being lower than the fourth series threshold, and
the first and fifth adaptive disable signals are inactive.

29. Detection device according to claim 28, wherein the sixth detection means comprise sixth storage means counting the number of times the current differential signal successively undergoes a first very sharp decrease where said signal is lower than a second series threshold, a second less sharp decrease where said signal is higher than a third series threshold, and a sharp increase where said signal is higher than a fourth series threshold.

30. Detection device according to claim 29, wherein the sixth detection means supply a sixth decision-making aid signal if the number of times the current differential signal successively undergoes a first very sharp decrease where said signal is lower than a second series threshold, a second less sharp decrease where said signal is higher than a third series threshold, and a sharp increase where said signal is higher than a fourth series threshold, is greater than a sixth counting threshold.

31. Detection device according to claim 28, wherein the duration of the sixth analysis period is comprised between a half a second and a second and a half.

32. Detection device according to claim 1, wherein analyzing means comprise a means for determining the maximum value of the AC current, at the rhythm of a sequencing signal.

33. Detection device according to claim 1, comprising means for sampling the measured current and voltage signals and comprises means for storing said sampled signals.

34. Detection device according to claim 1, comprising means for sampling the current and voltage integration signals and comprises means for storing said sampled signals.

35. Detection device according to claim 1, wherein the synchronization unit supplies a sequencing signal to the analyzing means synchronizing operation of each means for computing the current and voltage integration and differential signals on that of said sequencing signal.

36. Detection device according to claim 1, wherein the synchronization unit supplies a sequencing signal to each detection means synchronizing their operation with that of said sequencing signal.

37. Switchgear device comprising an opening mechanism of electric contacts and a control relay connected to a detection device according to claim 1, wherein the control relay is destined to receive at least one trip signal from the decision-making means of the detection device.

38. Method for detecting an electric arc comprising:
measurement of an AC current and an AC voltage with measuring means,
computation at the rhythm of a sequencing signal,
of an integral of an absolute value of the AC current and of the AC voltage over at least one mains half-wave,
of a current integration signal and a voltage integration signal,
supply of a current differential signal representative of the difference between a first current integration signal and a second current integration signal measured over a period before said first integration signal,
supply of a voltage differential signal representative of the difference between a first voltage integration signal and a second voltage integration signal measured over a period before said first integration signal,
comprising supply of a trip signal dependent on the value of decision-making aid signals, each decision-making aid signal being determined according to:
supply of at least one adaptive disable signal and
the current differential signal or the current integration signal.

39. Method for detecting an electric arc according to claim 38, wherein it synchronizes the sequencing signal with zero crossing of the AC voltage.

40. Method for detecting an electric arc according to claim 38, comprising supply of a first active adaptive disable signal when the sequencing signal is no longer synchronized on zero crossing of the AC voltage.

41. Method for detecting an electric arc according to claim 38, comprising supply of a second active adaptive disable signal when the current differential signal follows the same variation as the voltage differential signal during an analysis period of the current.

42. Method for detecting an electric arc according to claim 38, comprising supply of a third active adaptive disable signal when the current differential signal decreases to a zero value after undergoing a sharp increase.

43. Method for detecting an electric arc according to claim 38, comprising supply of a fourth active adaptive disable signal when the AC current is of asymmetric shape with respect to a zero current line, the asymmetric tending to decrease and then cancel out.

44. Method for detecting an electric arc according to claim 38, comprising supply of a fifth active adaptive disable signal when a decrease of the current differential signal is greater than the mean value of the current integration signal.

45. Method for detecting an electric arc according to claim 38, comprising supply of a first decision-making aid signal if, over a first analysis period:

the current integration signal is higher than a saturation threshold at least once, and the first adaptive disable signal is inactive.

46. Method for detecting an electric arc according to claim 38, comprising supply of a second decision-making aid signal if, over a second analysis period:

the current differential signal is successively:
higher than an absolute threshold at least once,
increasing with a higher variation rate than a relative variation threshold, and the first, second, third and fourth adaptive disable signals are inactive.

47. Method for detecting an electric arc according to claim 38, comprising supply of a third decision-making aid signal if, over a third analysis period:

the current differential signal is higher than a first saline threshold at least once, while at the same time not having been lower than a first series threshold during the previous two half-waves of the AC current, and the first, second, third and fourth adaptive disable signals are inactive.

48. Method for detecting an electric arc according to claim 38, comprising supply of a fourth decision-making aid signal if, over a fourth analysis period:

the current differential signal is lower than a first series threshold at least once, while at the same time not having been higher than a first saline threshold during the previous two half-waves of the AC current, and the first, second, third and fourth adaptive disable signals are inactive.

49. Method for detecting an electric arc according to claim 38, comprising supply of a fifth decision-making aid signal if, over a fifth analysis period:

the current differential signal successively undergoes at least once:

a first very sharp increase where said signal is higher than a second saline threshold, a second increase that is less sharp than the first increase where said signal is lower than a third saline threshold, a sharp decrease where said signal is lower than a fourth saline threshold, the second saline threshold being higher than or equal to the third saline threshold and the third saline threshold being higher than the fourth saline threshold, and the first adaptive disable signal is inactive.

50. Method for detecting an electric arc according to claim 38, comprising supply of a sixth decision-making aid signal if, over a sixth analysis period, the current differential signal successively undergoes at least once:

a first very sharp decrease where said signal is lower than a second series threshold, a second decrease that is less sharp than the first decrease, where said signal is higher than a third series threshold, a sharp increase where said signal is higher than a fourth series threshold, the second series threshold being lower than or equal to the third series threshold and the third series threshold being lower than the fourth series threshold, and the first and fifth adaptive disable signals are inactive.

* * * * *